(12) United States Patent
Sih et al.

(10) Patent No.: US 6,606,700 B1
(45) Date of Patent: Aug. 12, 2003

(54) DSP WITH DUAL-MAC PROCESSOR AND DUAL-MAC COPROCESSOR

(75) Inventors: Gilbert C. Sih, San Diego, CA (US); Hemant Kumar, San Diego, CA (US); Way-Shing Lee, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/513,979

(22) Filed: Feb. 26, 2000

(51) Int. Cl.[7] .......................... G06F 15/82; G06F 9/302
(52) U.S. Cl. .................. 712/35; 712/221; 712/222; 708/503; 708/501
(58) Field of Search ................. 712/221, 222, 712/35, 38, 39, 33, 208, 25; 708/507, 501, 503

(56) References Cited

U.S. PATENT DOCUMENTS 4,766,564 A * 8/1988 DeGroot .................. 708/507
6,418,527 B1 * 7/2002 Rozenshein et al. ........ 712/208

* cited by examiner

*Primary Examiner*—Daniel H. Pan
(74) *Attorney, Agent, or Firm*—Philip R. Wadsworth; Charles D. Brown; Howard H. Seo

(57) ABSTRACT

The invention is a digital signal processor architecture that is designed to speed up frequently-used signal processing computations, such as FIR filters, correlations, FFTs, and DFTs. The architecture uses a coupled dual-MAC architecture (MAC1), (MAC2) and attaches a dual-MAC coprocessor (MAC3), (MAC4) onto it in a unique way to achieve a significant increase in processing capability.

6 Claims, 5 Drawing Sheets

DSP WITH DUAL-MAC PROCESSOR AND DUAL-MAC COPROCESSOR

BACKGROUND OF THE INVENTION

1. Technical Field

This invention relates to digital signal processors, and has particular relation to multiply-accumulate (MAC) units.

2. Background Art

Digital Signal Processors (DSPs) are specialized types of microprocessors that are specifically tailored to execute mathematical computations very rapidly. DSPs can be found in a variety of applications including compact disk players, PC disk drives, telecommunication modem banks, and cellular telephones.

In the cellular telephone context, the demand for DSP computation capability continues to grow, driven by the increasing needs of applications such as GPS position location, voice recognition, low-bit rate speech and audio coding, image and video processing, and 3G cellular modem processing. To meet these processing demands, there is a need for improved digital signal processor architectures that can process computations more efficiently.

Considerable work has been done in these areas. Applicant Sih is also an applicant in the following applications for United States patents:

"Multiple Bus Architecture in a Digital Signal Processor", Ser. No. 09/044,087, filed Mar. 18, 1998 now abandoned;

"Digital Signal Processor Having Multiple Access Register", Ser. No. 09/044,088, filed Mar. 18, 1998 U.S. Pat. No. 6,496,920;

"Memory Efficient Instruction Storage", Ser. No. 09/044,089, filed Mar. 18, 1998 now abandoned;

"Highly Parallel Variable Length Instructions for Controlling a Digital Signal Processor", Ser. No. 09/044,104, filed Mar. 18,1998 now abandoned ;

"Variable Length Instruction Decoder", Ser. No. 09/044,086, filed Mar. 18,1998 now U.S. Pat. No. 6,425,070;

"Digital Signal Processor with Shiftable Multiply Accumulate Unit", Ser. No. 09/044,108, filed Mar. 18,1998 now abandoned.

The disclosure of these applications is incorporated herein by reference.

BRIEF DISCLOSURE OF THE INVENTION

The invention is a digital signal processor architecture that is designed to speed up frequently-used signal processing computations, such as FIR filters, correlations, FFTs, and DFTs. The architecture uses a coupled dual-MAC architecture and attaches a dual-MAC coprocessor onto it in a unique way to achieve a significant increase in processing capability.

DETAILED DESCRIPTION OF THE PREFERRED EMBODIMENTS

Figure 1:
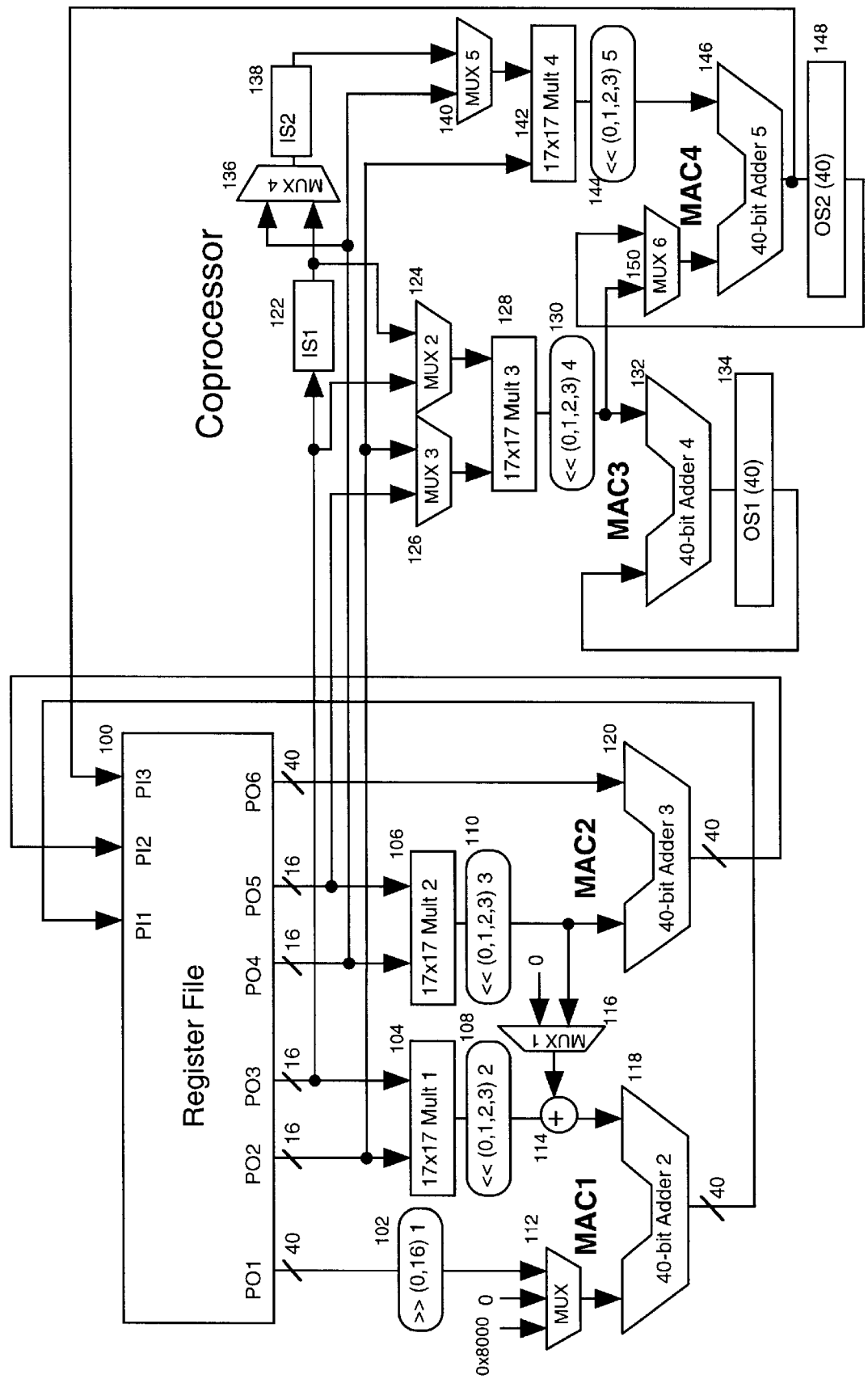
FIG. 1 is a block diagram of the new architecture.

FIG. 1 is a block diagram of the new architecture. In a narrow embodiment of the invention, an electronic circuit includes a register file (100) having first through third inputs (PI1-PI3) and first through sixth outputs (PO1-PO6). A first shifter (102) receives the first output (PO1) of the register file, a first multiplier (104) receives the second (PO2) and third (PO3) outputs of the register file, and a second multiplier (106) receives the fourth (PO4) and fifth (PO5) outputs of the register file. A second shifter (108) receives the output of the first multiplier (104), and a third shifter (110) receives the output of the second multiplier (106). A rounding multiplexer (112) receives the output of the first shifter (102), and a first adder (114) receives, at a first input, the output of the second shifter (108). A first multiplexer (116) receives either a zero or the output of the third shifter (110), and applies an output to a second input of the first adder (114). A second adder (118) receives the outputs of the rounding multiplexer (112) and the first adder (114), and the output of the second adder (118) is fed back to the first input (PI1) of the register file. A third adder (120) receives the outputs of the third shifter (110) and the sixth register output (PO6), and the output of the third adder (120) is fed back to the second input (PI2) of the register file.

A first input storage element (122) receives the third output (PO3) of the register file. A second multiplexer (124) receives the output of the first input storage element (122) and the third output (PO3) of the register file, and a third multiplexer (126) receives the second (PO2) and fifth (PO5) outputs of the register file. A third multiplier (128) receives the outputs of the second (124) and third (126) multiplexers, and a fourth shifter (130) receives the output of the third multiplier (128). A fourth adder (132) receives, at a first input, the output of the fourth shifter (130), and a first output storage element (134) receives the output of the fourth adder (132). The output of the first output storage element (134) is applied to a second input of the fourth adder (132).

A fourth multiplexer (136) receives the outputs of the first input storage element (122) and the fourth output (PO4) of the register file, and a second input storage element (138) receives the output of the fourth multiplexer (136). A fifth multiplexer (140) receives the output of the second input storage element (138) and the fourth output (PO4) of the register file, and a fourth multiplier (142) receives the output of the fifth multiplexer (140) and the second output (PO2) of the register file. A fifth shifter (144) receives the output of the fourth multiplier (142), and a fifth adder (146) receives, at a first input, the output of the fifth shifter (144). A second output storage element (148) receives the output of the fifth adder (146). The output of the second output storage element (148) is applied to a first input of a sixth multiplexer (150). The sixth multiplexer (150) receives the output of the fourth shifter (130) at a second input, and the output of the sixth multiplexer (150) is applied to a second input of the fifth adder (146). The output of the fifth adder (146) is also fed back to the third input (PI3) of the register file. The multiplexers are externally controlled.

The present invention, in its broadest embodiment, does not require all of the above components. Indeed, it is sufficient that the electronic circuit merely include a register file (100) including at least one input and at least four outputs (PO2-PO5); that the electronic circuit further include first (104), second (106), third (128), and fourth (142) multipliers, each having at least two inputs; that it also include first (118), second (120), third (132), and fourth (146) adders, each adder having, as a first input, an output of the corresponding multiplier (note that these first through fourth adders are the second through fifth adders of the more detailed device); and that the electronic circuit also include means (124), (126), (136), (140) for associating the outputs of the register file with the inputs of at least some of the multipliers, and means (112), (116), (150) for associating another input of at least some of the adders with an output of another multiplier, or with an output of the register file. It is this feature which causes the multipliers, adders, and register file to operate, together, in a single clock cycle.

Preferably, the number of register file outputs to the multipliers is four.

It is also preferred that the electronic circuit further include at least one input storage element (128), (138). The input of the input storage element is connected to an output (PO3) of the register file or to an output of another input storage element (122). The output of the input storage element is connected to an input of at least one of the multipliers (128), (142) or to an input of another input storage element (138). The multipliers, adders, input storage elements, and register file operate, together, in a single clock cycle.

While the invention will work with only a single input storage element, it is preferred that there be a plurality of input storage elements (122), (138).

The electronic circuit further preferably includes at least one output storage element (134), (148), connected to an output of at least one of the adders (132), (146). The multipliers, adders, output storage elements, and register file operate, together, in a single clock cycle.

It is preferred that the output storage element or elements (134), (148) be external to the register file (100).

FIG. 1 is, as noted above, a block diagram of the new architecture. The core architecture contains a coupled dual-MAC structure composed of MAC units MAC1 and MAC2. MAC1 fetches its multiplier operands from output ports PO2 and PO3 of the register file. The output of the multiplier (104) is passed to a shifter (108) that can shift the result left by 0, 1, 2, or 3 bits. The output of the shifter (108) is passed to an adder (114) that takes its other input from a multiplexer, MUX1 (116), that has zero and the result of the shifted product from MAC2 as its inputs. The output of the adder (114) is passed into a 40-bit adder (118) than can add another 40-bit operand fetched from output port PO1 of the register file. The output of the 40-bit adder is stored into the register file via input port PI1. MAC2 fetches multiplier operands from register file output ports PO4 and PO5, multiplies them (106), and shifts (110) the result left by 0, 1, 2, or 3 bits. The shifter output is passed to a 40-bit adder (120) that can add an additional register file operand fetched from output port PO6. The shifter output is also sent to the multiplexer, MUX1 (116) that feeds the first adder (114) in MAC1. The output of the 40-bit adder (120) is stored into the register file via register file input port PI2.

The coprocessor consists of multiply accumulate units MAC3 and MAC4 that have been connected to the core dual-MAC structure and the register file in a unique way. The inputs to MAC3 and MAC4 can be configured (via multiplexers MUX2 (124), MUX3 (126), and MUX5 (140)) to be taken from register file output ports PO2, PO3, PO4, PO5, or the delay line composed of 16-bit registers IS1 (122) and IS2 (138). The output of the shifted product in MAC3 can be fed into MAC4 via MUX6 (150). Alternatively, the 40-bit adders in MAC3 and MAC4 can take an input from their local 40-bit accumulator registers OS1 (134) and OS2 (148), respectively. The output of MAC4 can be written to the register file via input port PI3. The programmer can set up the multiplexers in the diagram to any desired configuration by executing certain program instructions, which allows the 4 MAC units to be flexibly configured to speed up several different types of computations. Several of these configurable modes are described below.

Figure 2:
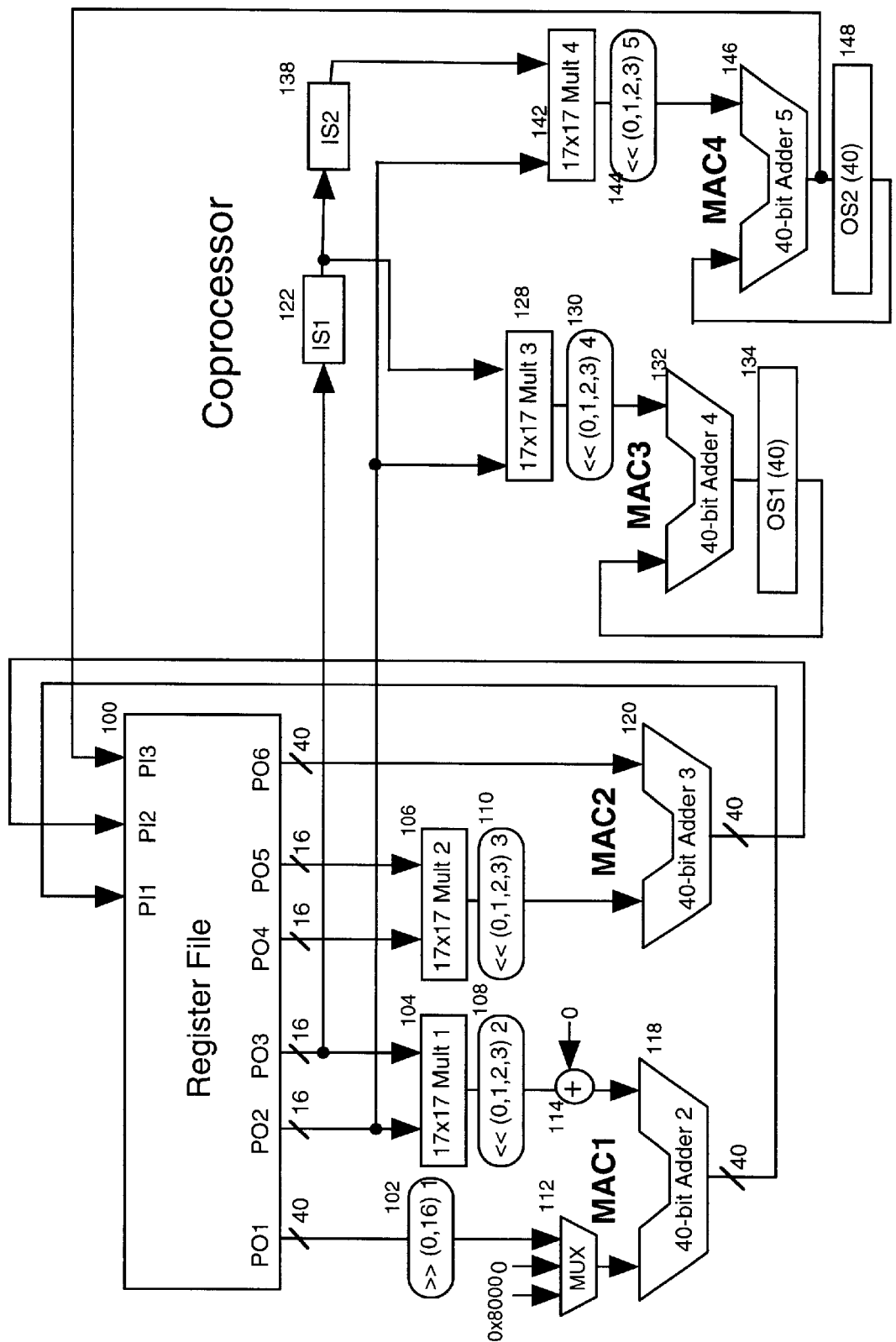
FIG. 2 shows the first configuration of the invention, in FIR Filter and Correlation Mode.

FIG. 2 shows the first configuration of the invention, in FIR Filter and Correlation Mode. It can be used to speed up FIR filters and correlation operations. To see why this configuration speeds up FIR filtering, we examine the equation for implementing an FIR filter:

$$y(n) = \sum_{k=0}^{N-1} h(k)x(n-k)$$

If we write out the equations for four consecutive outputs, we have $y(n)=h(0)\times(n)+h(1)\times(n-1)+h(2)\times(n-2)+ \ldots +h(N-1)\times(n-N+1)$ $y(n+1)=h(0)\times(n+1)+h(1)\times(n)+h(2)\times(n-1)+ \ldots +h(N-1)\times(n-N+2)$ $y(n+2)=h(0)\times(n+2)+h(1)\times(n+1)+h(2)\times(n)+ \ldots +h(N-1)\times(n-N+3)$ $y(n+3)=h(0)\times(n+3)+h(1)\times(n+2)+h(2)\times(n+1)+ \ldots +h(N-1)\times(n-N+4)$ To compute these four quantities simultaneously, the same coefficient h(k) is fed to all four multipliers simultaneously, while the other input is fed through a delay line to each of the multipliers. This is shown in the logical implementation diagram shown in FIG. 3.

Figure 3:
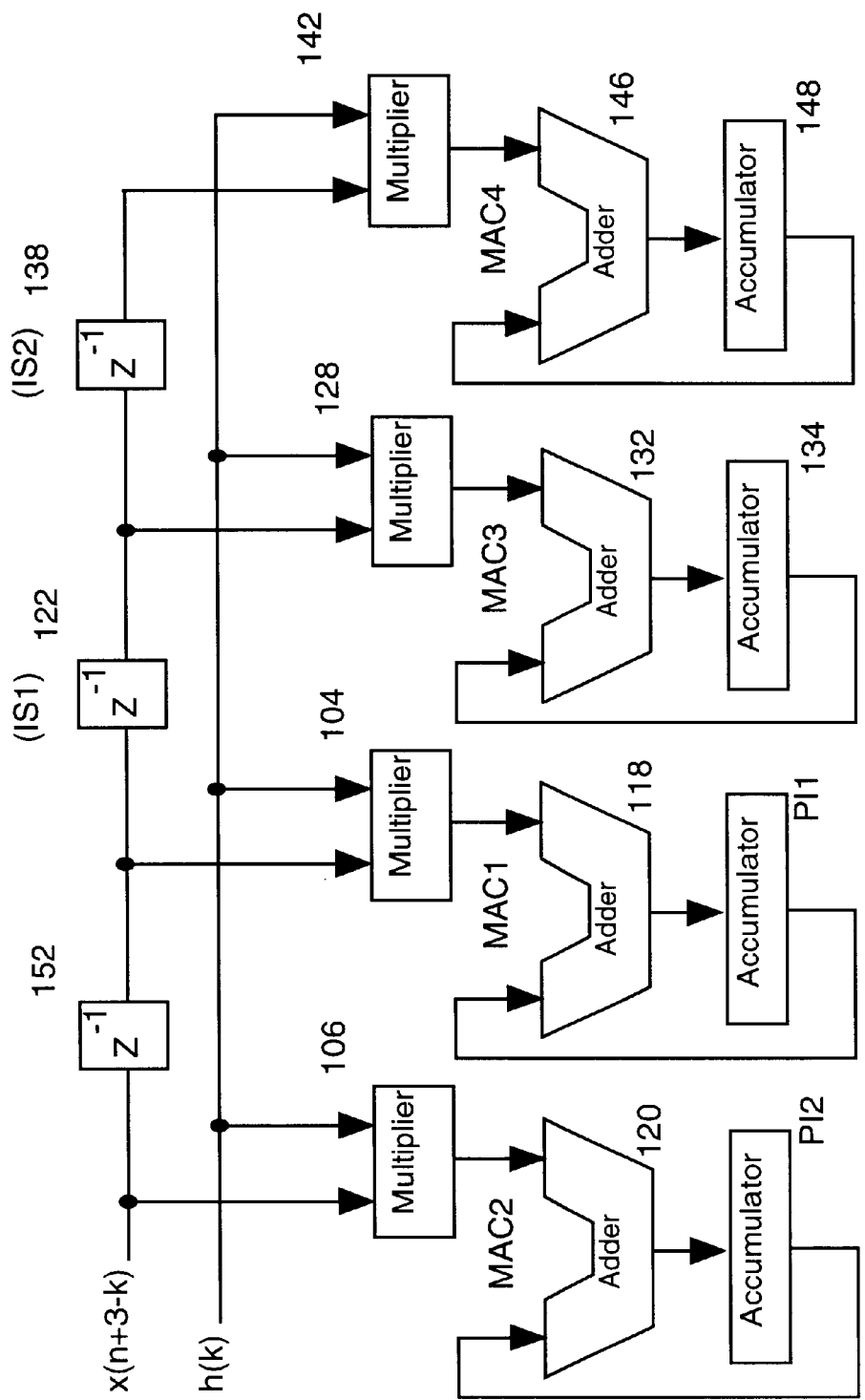
FIG. 3 is a logical diagram of the FIR Filter and Correlation Acceleration Mode.

FIG. 3 is a logical diagram of the FIR Filter and Correlation Acceleration Mode. To achieve this configuration using the hardware setup shown in FIG. 2, the programmer must execute the proper instructions for the 2 core MACs to insure correct operation. The same register fetched from register file output port PO2, and used as an input to each of the coprocessor MAC units, must also be fetched from output port PO4. The programmer must also insure that the register fetched out of PO5 is delayed by one cycle (152) using a parallel register move before being sent out on PO3 and propagated through the hardware delay line composed of registers IS1 (122) and IS2 (138). The two core MACs perform accumulation by fetching and storing results to the register file (100), while the coprocessor MACs perform accumulation using their local OS1 (134) and OS2 (148) accumulators. This configuration can also be used to speed up correlation operations in a similar manner.

Figure 4:
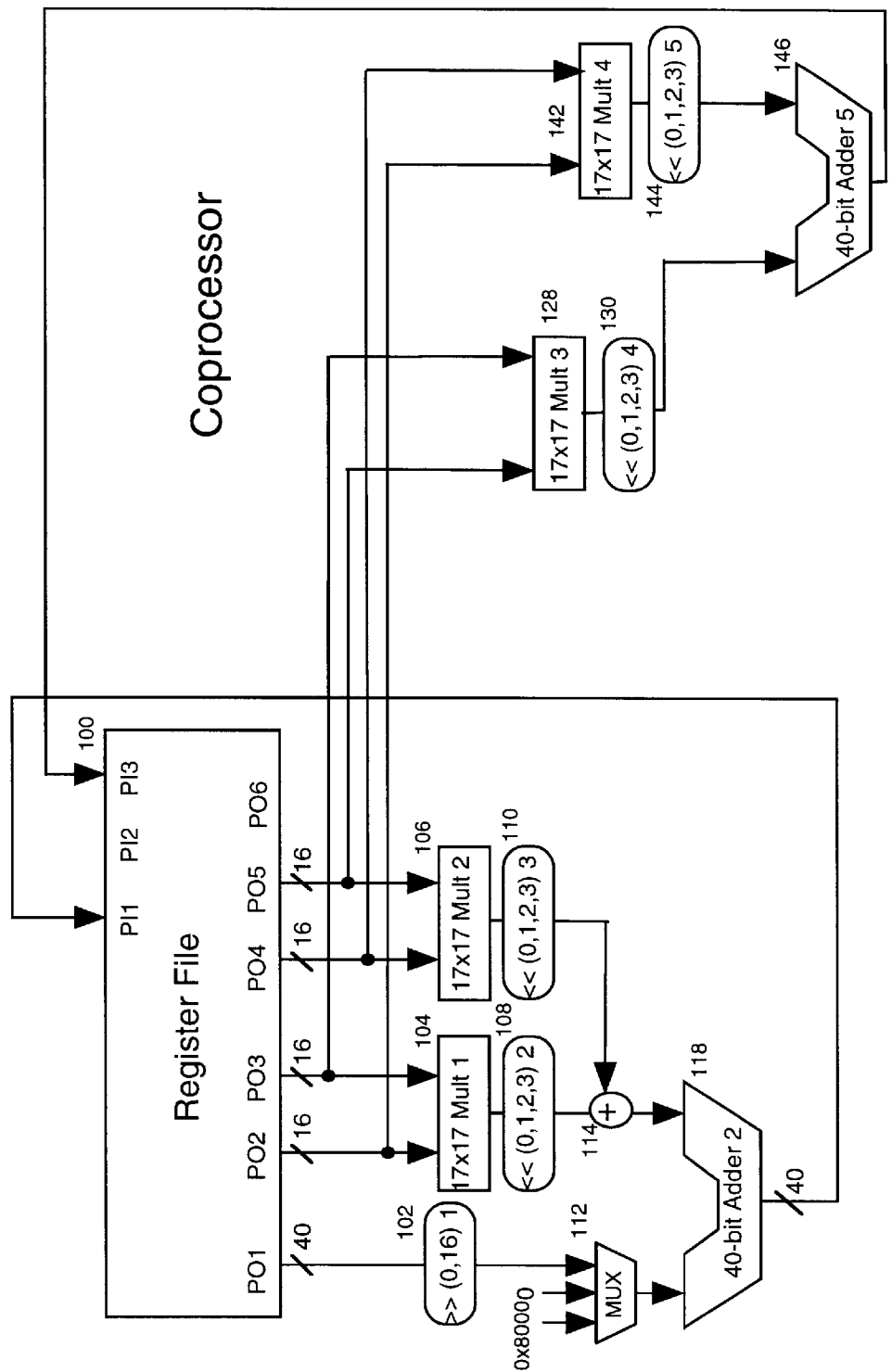
FIG. 4 shows another configuration, the Single-Cycle Complex Multiply Mode.

FIG. 4 shows another configuration, the Single-Cycle Complex Multiply Mode. To speed up FFTs and CDMA symbol demodulation, the coprocessor can also be configured to perform single-cycle complex multiplies. As the inputs to each of the core MAC units are sent to the coprocessor to perform the cross-term multiplies, the outputs of the core MAC units are added together and sent to the register file (100) via input port PI1, while the outputs of the coprocessor MAC units are added together and stored into the register file (100) via input port PI3.

Figure 5:
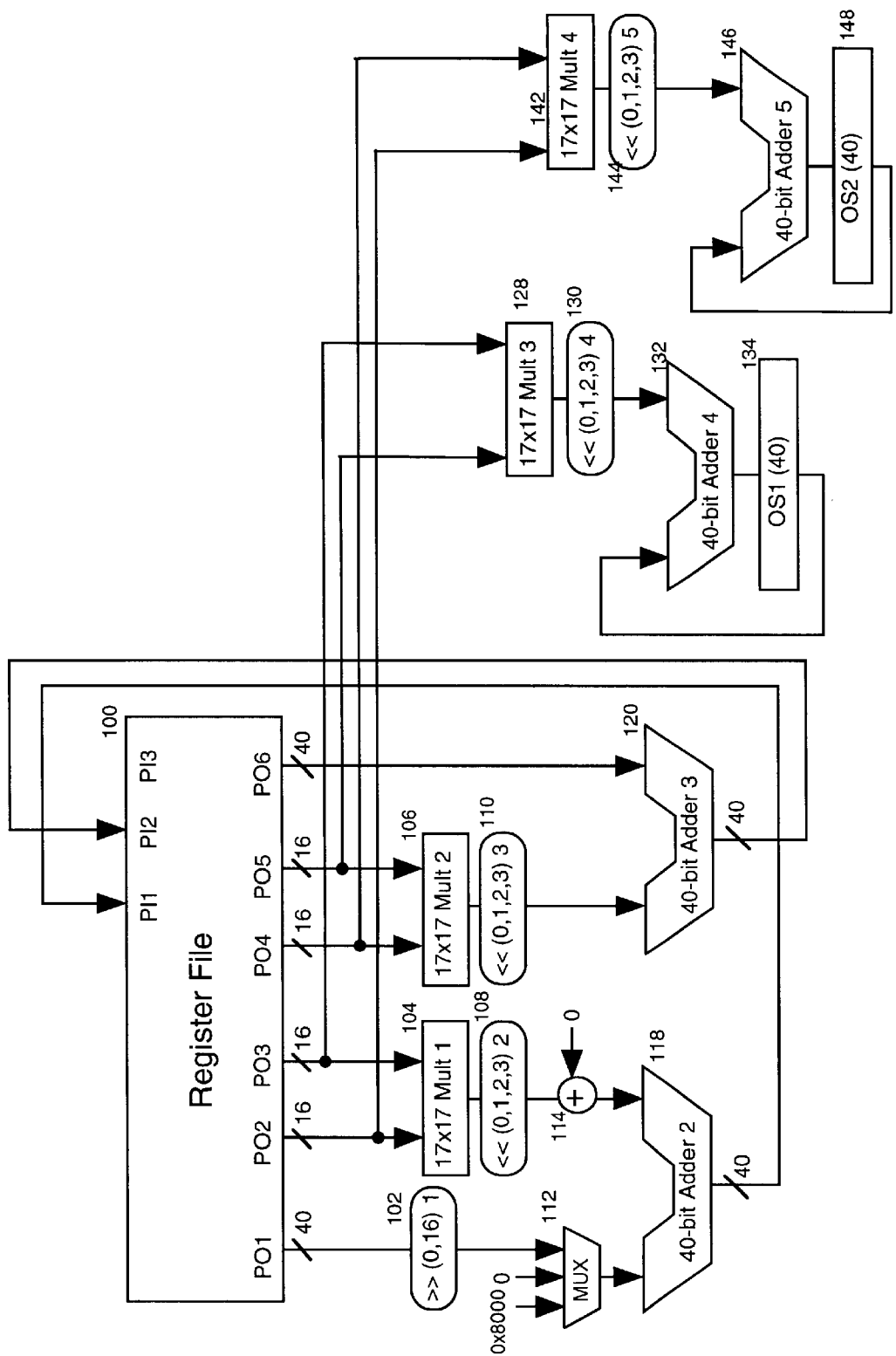
FIG. 5 shows yet another configuration, the Single-Cycle Complex Multiply-Accumulate Mode.

FIG. 5 shows yet another configuration, the Single-Cycle Complex Multiply-Accumulate Mode. The complex multiply-accumulate configuration is useful for speeding up DFTs and accumulations of 32×32 multiplies. As shown in FIG. 5, the multiplier input connections are set up like the single-cycle complex multiply, but the accumulations are set up like the FIR filter acceleration mode. In the 32×32 MAC case, the core MACs are performing signed-signed and unsigned-unsigned multiplies, while the coprocessor MACs are performing signed-unsigned multiplies.

The use of 40-bit adders and 17×17 bit multipliers is shown. This is conventional, but any convenient number of bits may be used.

Industrial Application

This invention is capable of exploitation in industry, and can be made and used, whenever is it desired to sped up signal processing computations. The individual components of the apparatus and method shown herein, taken separate and apart from one another, may be entirely conventional, it being their combination that is claimed as the invention.

While various modes of apparatus and method have been described, the true spirit and scope of the invention are not limited thereto, but are limited only by the following claims and their equivalents, and such are claimed as the invention.

What is claimed is:

1. An electronic circuit, characterized in that it includes:
   (a) a register file having first through third inputs and first through sixth outputs;
   (b) a first shifter receiving the first output of the register file;
   (c) a first multiplier receiving the second and third outputs of the register file and having an output;
   (d) a second multiplier receiving the fourth and fifth outputs of the register file and having an output;
   (e) a second shifter receiving the output of the first multiplier and having an output;
   (f) a third shifter receiving the output of the second multiplier and having an output;
   (g) a rounding multiplexer receiving the output of the first shifter and having an output;
   (h) a first adder receiving, at a first input, the output of the second shifter and having an output;
   (i) a first externally-controlled multiplexer receiving either a zero or the output of the third shifter, and applying an output to a second input of the first adder;
   (j) a second adder receiving the outputs of the rounding multiplexer and the first adder, and having an output which is fed back to the first input of the register file;
   (k) a third adder receiving the outputs of the third shifter and the sixth register output, and having an output which is fed back to the second input of the register file;
   (l) a first input storage element receiving the third output of the register file;
   (m) a second externally-controlled multiplexer receiving the output of the first input storage element, and the third output of the register file;
   (n) a third externally-controlled multiplexer receiving the second and fifth outputs of the register file;
   (o) a third multiplier receiving the outputs of the second and third externally-controlled multiplexers;
   (p) a fourth shifter receiving the output of the third multiplier;
   (q) a fourth adder receiving, at a first input, the output of the fourth shifter;
   (r) a first output storage element receiving the output of the fourth adder, the output of the first output storage element being applied to a second input of the fourth adder;
   (s) a fourth externally-controlled multiplexer receiving the output of the first input storage element and the fourth output of the register file;
   (t) a second input storage element receiving the output of the fourth externally-controlled multiplexer;
   (u) a fifth externally-controlled multiplexer receiving the output of the second input storage element and the fourth output of the register file;
   (v) a fourth multiplier receiving the output of the fifth externally-controlled multiplexer and the second output of the register file;
   (w) a fifth shifter receiving the output of the fourth multiplier;
   (x) a fifth adder receiving, at a first input, the output of the fifth shifter;
   (y) a second output storage element receiving the output of the fifth adder, the output of the first output storage element being applied to a first input of a sixth externally-controlled multiplexer, the sixth externally-controlled multiplexer, receiving the output of the fourth shifter at a second input, and the output of the sixth externally-controlled multiplexer being applied to a second input of the fifth adder.

2. An electronic circuit wherein:
   (a) the electronic circuit includes a register file including at least one input and at least four outputs; and
   (b) the electronic circuit is characterized in that is further includes:
      (1) first, second, third, and fourth multipliers, each having at least two inputs;
      (2) first, second, third, and fourth adders, each adder having as a first input an output of the corresponding multiplier;
      (3) means for associating the outputs of the register file with the inputs of at least some of the multipliers;
      (4) means for associating another input of at least some of the adders with an output of another multiplier, or with an output of the register file; and
      (5) at least one input storage element:
         (a) whose input is connected to:
            (1) an output of the register file: or
            (2) an output of another input storage element; and
         (b) whose output is connected to:
            (1) an input of at least one of the multipliers: or an input of another input storage element;
whereby the multipliers, adders, input storage elements and register file operate, together, in a single clock cycle.

3. The electronic circuit of claim 2, wherein the number of register file outputs to the multipliers is four.

4. The electronic circuit of claim 2, wherein there is a plurality of input storage elements.

5. An electronic circuit wherein:
   the electronic circuit includes a register file including at least one input and at least four outputs: and
   the electronic circuit is characterized in that is further includes:
      first, second, third, and fourth multipliers, each having at least two inputs;
      first, second, third, and fourth adders, each adder having as a first input an output of the corresponding multiplier;
      means for associating the outputs of the register file with the inputs of at least some of the multipliers;
      means for associating another input of at least some of the adders with an output of another multiplier, or with an output of the register file; and
      at least one output storage element, connected to an output of at least one of the adders, whereby the multipliers, adders, output storage elements, and register file operate, together, in a single clock cycle.

6. The electronic circuit of claim 5, wherein the output storage element is external to the register file.

* * * * *